Dec. 2, 1958  J. H. PAGE ET AL  2,862,645
CONTAINER
Filed Sept. 14, 1955  3 Sheets-Sheet 1

INVENTORS
JAMES H. PAGE,
THOMAS B. NIX,
RAYMOND I. REUL
BY
ATTORNEYS

Dec. 2, 1958 J. H. PAGE ET AL 2,862,645
CONTAINER
Filed Sept. 14, 1955 3 Sheets-Sheet 2
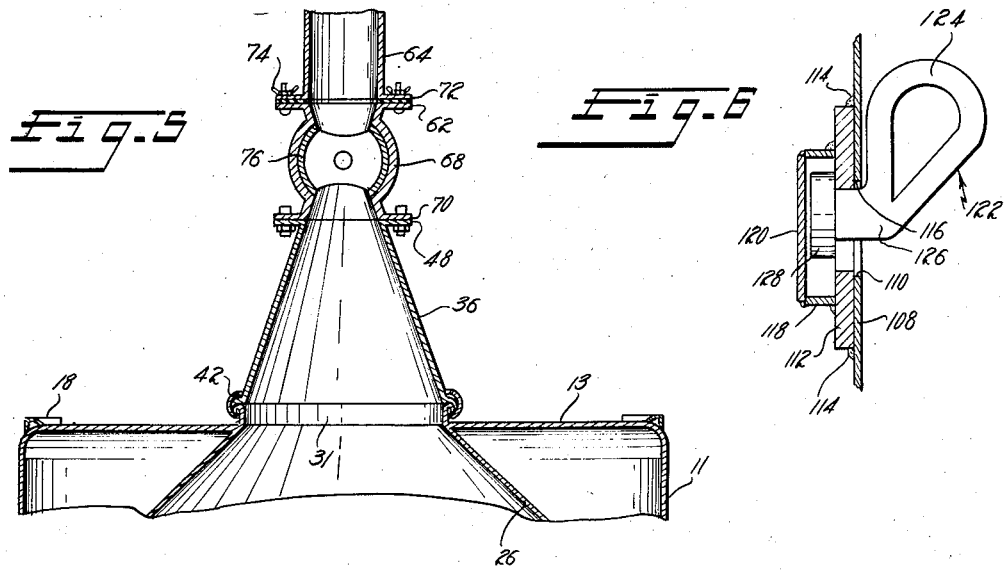
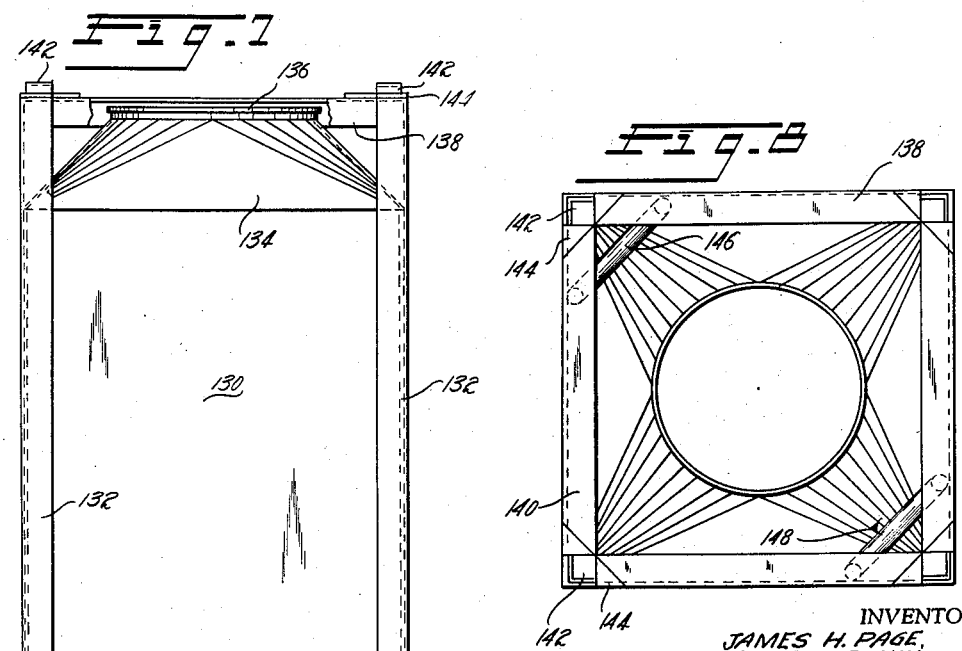
INVENTORS
JAMES H. PAGE,
THOMAS B. NIX,
RAYMOND I. REUL
BY
ATTORNEYS Dec. 2, 1958   J. H. PAGE ET AL   2,862,645
CONTAINER
Filed Sept. 14, 1955   3 Sheets-Sheet 3
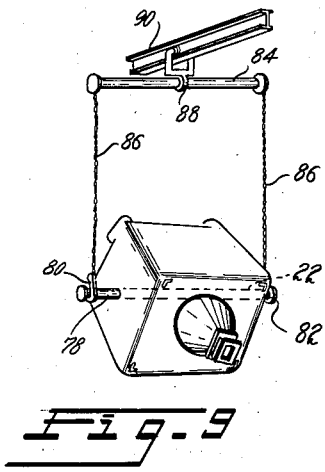
Fig. 9
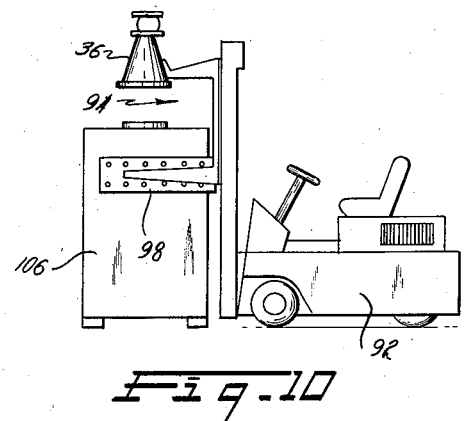
Fig. 10
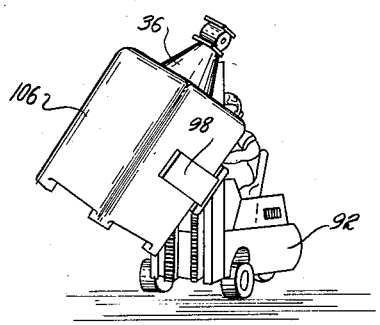
Fig. 11
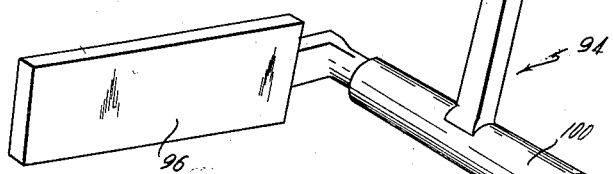
Fig. 12
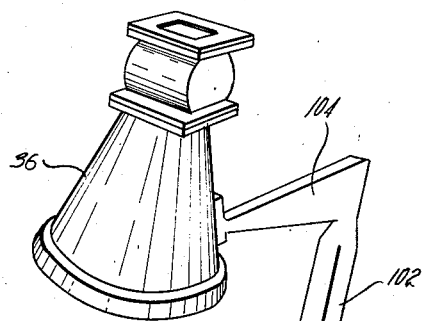
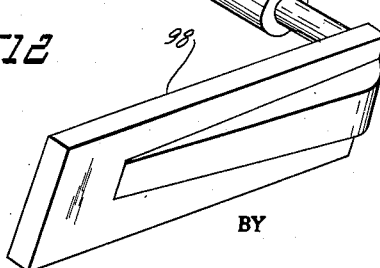
INVENTORS
JAMES H. PAGE,
THOMAS B. NIX,
RAYMOND I. REUL
BY
ATTORNEYS

| United States Patent Office | 2,862,645 |
|---|---|
| | Patented Dec. 2, 1958 |

2,862,645
CONTAINER

James H. Page, Prairieville, and Thomas B. Nix, Baton Rouge, La., and Raymond I. Reul, Westfield, N. J., assignors, by direct and mesne assignments, to Delta Tank Manufacturing Company, Inc., Baton Rouge, La., a corporation of Louisiana Application September 14, 1955, Serial No. 534,329

16 Claims. (Cl. 222—143)

This invention relates to containers and more particularly relates to containers for handling dry pulverant or granular materials which, because of their toxicity, dangerous chemical nature, or nuisance value, cannot be allowed to leak or to become contaminated.

Manufacturers, users and shippers of dry pulverant or granular materials which are dangerous in nature, have a high nuisance value, or are ruined by slight contamination, are faced with the problem not only of providing containers which will not leak during transit, but also of preventing leaking or contamination during either container loading or unloading operations. In certain instances the materials being handled are contaminated by exposure to air or, on the other hand, the escape of such materials may poison the air so as to create a menace to workmen. Under such circumstances a container must be gas tight and some additional provision must be made for loading and unloading the container without exposing the material to the atmosphere.

Containers heretofore used for transporting material of the foregoing type generally contain either separate filling and emptying openings at the top and bottom respectively, or they use a single opening at the top of the container with provision for inverting the container to remove the material. The use of dual access openings is expensive and the bottom openings are dangerous since any leakage can easily flood a railway car or truck with a hazardous or toxic material. The top opening containers designed to be emptied by inversion, on the other hand, allow contamniation of the material either during loading or unloading and do not prevent contamination of the surrounding atmosphere. Many pulverant materials are highly hygroscopic and must be shipped in a dehydrated state. This is difficult with conventional containers since they do not provide satisfactory means for preventing hydration during loading and unloading.

A further difficulty experienced with currently available containers is the necessity for cleaning at rather frequent intervals. Pulverent materials, particularly those which are hydrated to any marked degree, have a tendency to compact and stick to the container walls and particularly to the container corners. This requires a complete cleaning when it is desired to use the containers for different materials and, since the materials being shipped may be toxic, corrosive, or otherwise dangerous, this cleaning operation must be carried out with extreme precaution which adds materially to shipping and handling costs. In addition to the foregoing the closures provided on most conventional containers do not permit stacking and consequently container storage presents quite a problem.

According to our invention there is provided a container having a top opening which is adapted to receive either a flat gas tight closure or gas tight spout which may be connected for either gas tight loading or gas tight unloading of the material being handled. The containers are extremely rugged in character, relatively light in weight, may be stacked, and are of such a shape as to permit space saving storage. The containers are constructed in a manner which insures self-cleaning during handling of the materials and are adapted for use on standard skeletal railway cars or trucks.

It is accordingly a primary object of the present invention to provide an improved container for handling pulverant or granular materials without leakage or contamination of the materials.

It is another object of the invention to provide containers of the foregoing type which have an adapter to permit gas tight loading and unloading thereof.

It is another object of the invention to provide an improved container for handling pulverant or granular materials having a single access opening which interchangeably receives either a closure or a spout in gas tight relation.

It is another object of the invention to provide containers of the foregoing type which are rectangular in shape and which contain an internal means which facilitates unloading and which provides a large measure of self-cleaning.

It is another object of the invention to provide a means for shipping hazardous chemicals comprising a container having a removable spout containing a flow control device.

It is another object of the invention to provide a container for shipping hazardous chemicals without danger of leakage or contamination having a quick releasable loading and unloading spout which is interchangeable with a closure.

It is another object of the invention to provide a container for shipping hazardous chemicals which is substantially rectangular in shape, has recessed lifting sockets in the side walls thereof and is provided with means for stacking the containers in a minimum space.

It is another object of the invention to provide a container for shipping hazardous chemicals which has substantially flat sides, is light in weight and structurally rigid.

It is another object of the invention to provide a container for shipping hazardous chemicals which has a single access opening adapted to engage a spout in gas tight relationship wherein the spout is adapted to engage a further vessel in gas tight relationship.

These and further objects and advantages of the invention will become apparent upon reference to the following detailed description and claims and the appended drawings wherein:

Figure 5 is a vertical section through a gate valve type spout;

Figure 6 is a vertical section showing a recessed lifting socket;

Figure 7 is a side elevation of another embodiment of container;

Figure 8 is a plan view of the container shown in Figure 7;

Figure 9 shows a container being inverted in order to empty its contents;

Figure 10 shows a container having a spout attached thereto by means of a lifting truck and a special spout fixture;

Figure 11 shows a container being inverted by a lifting truck after the spout and special spout fixtures have been attached; and Figure 12 shows the special spout fixture with spout attached.

Figure 1:
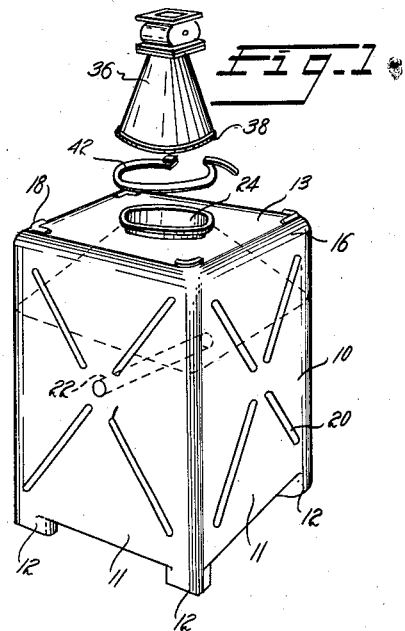
Figure 1 is a perspective view of a container showing the spout and clamping means prior to assembly.

Referring to Figure 1 there is shown a rectangular container body 10 consisting of a bottom wall, side walls 11 and top wall 13, with all such walls being joined by relatively large radius corners 16 which greatly facilitate cleaning when this is necessary. The top is provided with nesting shoulders 18 at the corners thereof and these shoulders are so shaped as to mate with feet 12 which are attached to the bottom wall. The feet and nesting shoulders permit vertical stacking of the containers and also provide a means for securing the containers to railway cars or trucks. The container is assembled from sheet material which has strengthening ribs 20 embossed in the side in a diagonal pattern in order to provide high structural rigidity without any increase in weight. While sheet metal is the preferred material, various plastics such as fiber glass reinforced plastics may also be used. A lifting conduit 22, such as a section of pipe, extends through the container and is welded to opposite side walls thereof in order to seal the container. An aperture 24 is provided in the top wall 14.

We have found that emptying of the container is facilitated and a large measure of self-cleaning is obtained if the top of the container body is provided with an internal funnel shaped transition member 26 having a rectangular bottom end 28 and a circular top end 30. As the pulverant or granular material flows out through the aperture 24 when the container is inverted, it slides across the inclined sides of the transition number 26 to scour away any material which might tend to adhere thereto. There are no perfectly square corners to become caked with the material being handled and the angle formed between the sides of the transition member and the sides of the container body is sufficiently small to insure a thorough and rapid emptying. In the illustrated embodiment of the invention this angle is approximately 45° and we have found that it should not exceed 60° in order to obtain the desired self-cleaning action. The transition member also adds considerable rigidity to the container body and permits the use of lighter gauge wall metal than would otherwise be possible.

Figure 4:
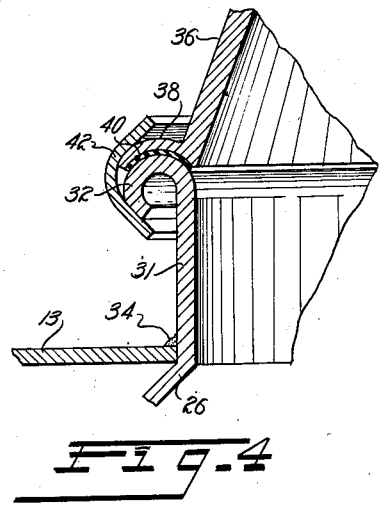
Figure 4 is a vertical section showing the quick release gas tight seal between the spout and container.

The upper end of the transition member forming the end 30 is in the form of a short cylinder 31 which passes through the top wall 13 and terminates in an outwardly curled bead 32, best seen in Figure 4. This cylindrical section 31 is sealed to the top wall 13 by means of a weld 34 extending completely therearound.

Figure 2:
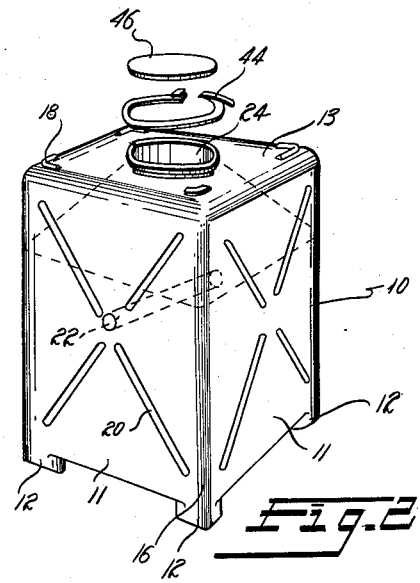
Figure 2 is a perspective view of a container showing the lid and clamping means prior to assembly.
Figure 3:
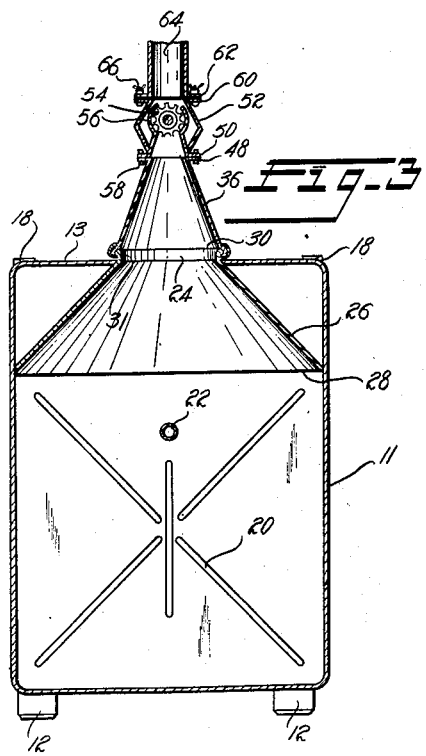
Figure 3 is a vertical cross section of a container having a metering spout attached thereto.

Referring to Figures 3 and 4, a conical spout 36 is mounted on the container by means of a curvate rim or flange 38 which mates with the bead 32. A gasket 40 may be attached either to the rim 38 or the bead 32 but is preferably attached to the rim in order to secure the protection afforded by its concave shape. A toggle action snap ring 42 engages the undersurface of the bead 32 and the upper surface of the rim 38 in order to seal the spout to the container in a gas tight manner. The ring 42 may be provided with a toggle type lock 44 as shown in Figure 1 or may be provided with a bolt. Referring to Figure 2, a flat closure disc 46 is provided as a lid for covering the aperture 24 and this lid may be secured thereto by means of the same clamping ring 42 as is used to fasten the spout. With the lid 46 fastened over the aperture 25 there is no substantial protuberance upon the container top and a second container may be stacked thereover with the feet 12 providing all of the necessary clearance. It will be apparent that with such a simple and compact lid a minimum of space is wasted in stacking the containers.

While the spout may consist of a simple conical member 36, shown in Figure 3, it is normally desirable to provide the spout with either a feeder or metering mechanism or with some type of valve which can maintain the contents of the container in a sealed condition until it is desired to empty it. Referring to Figure 3 it will be seen that the spout 36 is provided with a flange 48 at its upper end and this flange mates with a flange 50 on a feeder housing 52. The feeder consists of a rotary impeller 54 rotating in a conduit 56 and the feeder may be assembled with the spout by means of bolts 58 in order to form an integral unit which may be referred to as a feeder spout. The feeder is provided at is upper mouth with a flange 60 which is adapted to mate with a flange 62 on a conduit or vessel 64 from which the pulverant material is being received and these flanges may be connected together by quick releasable butterfly nuts 66 which serve to clamp a gasket between the flanges 60 and 62. The vessel or conduit 64 is thus sealed to the container body 10 by gas tight seals at both ends of the feeder spout. It will be obvious that while Figure 3 shows the container sealed to a vessel thereabove for loading, the same type of seal obtains when the container is inverted and the spout secured to a vessel into which the material is to be transferred.

Referring to Figure 5 there is shown another embodiment of a spout wherein the conical spout portion 36 is connected to a gate valve housing 68 by means of mating flanges 48 and 70, and the upper end of the gate valve housing is connected to the conduit or vessel 64 by means of flanges 62 and 72 and butterfly nuts 74. A valve member 76 is rotatably mounted in the valve housing 68.

A large variety of spouts may be provided so that it is possible to handle different types of materials with spouts specially designed for this purpose. In certain instances different loading and unloading spouts may be desirable and, since these two spouts will normally be utilized in widely spaced localities by the shipper and puchaser respectively, it is unnecessary for either the shipper or the purchaser to have both types of spouts. While such special spouts may be utilized, it is also possible to provide a spout, such as those shown in Figures 3 and 5, which is adequate to perform both the loading and unloading functions. In all instances a gas tight seal is provided between the container and the spout and between the spout and the vessel or receptacle from which the material is being removed or into which the material is being delivered. Because the container may be utilized with such a wide variety of spouts it is possible to use a standard container to handle a large variety of materials for delivery from and into varying types of other receptacles.

Referring to Figures 9 through 11 there are shown two convenient manners for emptying the containers. Thus in Figure 9 a bar 78 is passed through the conduit 22 in the container body and this is supported by means of a pair of hooks 80 and 82 suspended from a bar 84 by means of chains 86. The upper bar 84 may be carried by means of an ordinary overhead crane 88 rolling on a girder 90. Referring to Figure 10 there is shown a lift truck 92 which is provided with a lifting fixture shown generally at 94. This lifting fixture consists of a pair of side clamping arms 96 and 98 carried by the actuating assembly 100 which is connected to the power source on the lifting truck 92. This connection is such that the entire spout fixture 94 is capable of moving up and down while the clamping arms 96 and 98 may be moved toward or away from each other in order to clamp a container therebetween. An arm 102 extends upwardly from the actuating assembly 100 and carries a spout support 104 at the upper end thereof to which the conical spout 36 is attached.

Referring to Figure 10 the spout attachment 94 and spout 36 are shown being lowered onto a container 106, while in Figure 11 the container is shown being tilted by the lift truck preparatory to emptying. Although the spout 36 may be clamped to the container mouth by means of a clamp ring, such as the clamp ring 42 shown in Figure 1, it is also contemplated that the rim of the spout may be provided with a gasket sufficiently thick to allow a seal to be made by simply lowering the spout into firm contact with the container mouth by means of the lifting truck 92.

While the containers shown in Figures 1, 2 and 3 are provided with conduits which extend completely through the container body, it is desirable in some instances to dispense with such a through conduit and a preferred means for accomplishing this is shown in Figure 6. The sheet metal wall 108 of a container body is provided with an aperture 110 to which a washer shaped reinforcing member 112 is welded at 114 and 116. The opening through the aperture and washer is sealed by means of a short cylindrical member 118 closed by means of a disc 120. In order to lift the container the cap 128 of a hook 122 is inserted through the opening so that the bearing portion 126 engages the reinforcing washer 112. An eye 124 is provided for attachment of a chain or other suitable lifting means. This type of arrangement dispenses with the through conduit while at the same time providing recessed lifting sockets and complete sealing. This is important from a shipping and storage standpoint since it is frequently necessary to stack the containers in side-by-side contacting relation in order to properly secure them to skeletal freight cars or trucks.

While the containers shown in Figures 1, 2 and 3 represent the preferred embodiment of our invention it is also contemplated that containers may be manufactured without enclosing the transition member within an upper rectangular chamber. Thus referring to Figures 7 and 8 there is shown a container body 130 having angle irons 132 welded to each corner thereof and extending above the transition portion 134 to terminate slightly above the lip 136. Cross members 138 and 140 of angle iron are secured to these upwardly extending angles 132, as by welding, and nesting shoulders 142 are mounted upon triangular plates 144 at the corners of the frame thus formed. Bars 146 and 148 are secured diagonally across two opposite corners in order to provide means for lifting the container.

It will be apparent from the foregoing that I have provided an improved container for handling pulverant or granular materials, particularly those which are hazardous or toxic, which provides for easy loading and unloading without contaminating either the surrounding air or the material. The containers may be stacked and stored in a minimum of space, are light weight, inexpensive, and rugged in character. A novel type spout arrangement is provided which facilitates container loading and unloading in a minimum of time with a maximum gas tight integrity.

While our invention has been described in terms of a preferred embodiment having a rectangular body with a circular opening therein it is not limited to such shapes, but may be modified to meet specific requirements as will be apparent to those skilled in the art.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A container comprising a hollow body, a plurality of nesting legs on the bottom of said body, a plurality of nesting shoulders on the top of said body, the top of said body defining an aperture having securing means therearound adapted to be interchangeably secured in gas tight relation to a removable closure means and spout means, and a transition member within said body forming a delivery conduit between a portion of said body below said top and said aperture in said top.

2. A container comprising a hollow body having a rectangular cross section and a substantially flat top, the top of said body having a round aperture therein, securing means around said aperture adapted to be interchangeably secured to a removable closure and spout means, and a transition member within said body forming a delivery conduit between a portion of said rectangular body below said top and said round aperture in said top, the walls of said transition member forming an angle of no more than 60 degrees with the walls of said container to which said transition member is attached.

3. A substantially flat walled rectangular container comprising side, bottom, and top walls, the top wall having a round aperture therein, a transition member mounted within said body and having one end thereof secured to the inner surfaces of said side walls below said top wall, a cylindrical member connected to the other end of said transition member and passing through said aperture in said top wall, and securing means on said cylindrical member adapted to be interchangeably secured to a removable closure means and spout means.

4. A substantially flat walled rectangular container for dry pourable materials formed from sheet metal defining side, bottom and top walls, the top wall having a round aperture therein, a plurality of nesting legs on the bottom wall of said body, a plurality of nesting shoulders on the top wall of said body, a pair of lifting openings in opposite side walls of said body, means within said body sealing said openings from access with the inside of said body, a transition member mounted within said body and having one end thereof secured to the inner surfaces of said side walls below said top wall, a cylindrical member connected to the other end of said transition member and passing through said aperture in said top wall and sealed thereto, and a peripheral outwardly extending bead on said cylindrical member adapted to be interchangeably secured to a removable closure means and spout means.

5. A substantially flat walled rectangular container for dry pourable materials formed from sheet metal defining side, bottom and top walls, the top wall having a round aperture therein, a plurality of nesting legs on the bottom wall of said body, a plurality of nesting shoulders on the top wall of said body, a pair of lifting openings in opposite side walls of said body, means within said body sealing said openings from access with the inside of said body, a transition member mounted within said body and having one end thereof secured to the inner surfaces of said side walls below said top wall, a cylindrical member connected to the other end of said transition member and passing through said aperture in said top wall and sealed thereto, a peripheral outwardly extending bead on said cylindrical member, a spout means mounted on said cylindrical member, means engaging said bead and removably locking said spout means to said cylindrical member.

6. A substantially flat walled rectangular container for pulverant materials formed from sheet metal defining side, bottom and top walls, the top wall having a round aperture therein, a plurality of nesting legs on the bottom wall of said body, a plurality of nesting shoulders on the top wall of said body, a pair of lifting openings in opposite side walls of said body, means within said body sealing said openings from access with the inside of said body, a transition member mounted within said body and having one end thereof secured to the inner surfaces of said side walls below said top wall, a cylindrical member connected to the other end of said transition member and passing through said aperture in said top wall and sealed thereto, a peripheral outwardly extending bead on said cylindrical member, a spout means mounted on said cylindrical member, a ring having a substantially semi-circular cross section engaging said bead and said spout means to removably lock said spout means to said cylindrical member in gas tight relationship.

7. A container as set out in claim 6 wherein said spout contains a flow control means.

8. A container comprising a hollow sheet metal body having a substantially rectangular cross section, an aperture defined in the top of said container providing the only access to material in said container, securing means about said aperture for interchangeably engaging a closure means and a spout means in gas tight relationship, said container having two parallel flat side walls defining alined apertures, cylindrical members having one end secured to the inside of said side walls in communication with said apertures, the inside diameter of said cylindrical members being larger than the diameter of said alined apertures, and closure members secured across the other ends of said cylindrical members to seal said container.

9. A container comprising a hollow sheet metal body having a substantially rectangular cross section, and having flat, bottom and top and side walls, nesting legs secured to the four corners of said bottom, nesting shoulders shaped to mate with said nesting legs secured to the four corners of said top, an aperture defined by an upturned flange on said top, said flange being shorter in height than said legs, and a funnel shaped transition member having a substantially rectangular large end secured completely therearound to the inner surfaces of said side walls in a plane parallel to and intermediate said top and bottom, the small end of said transition member being secured completely therearound to said top to form said upturned flange.

10. A container having a substantially rectangular bottom and having side walls attached to said bottom, a funnel shaped transition portion attached to said side walls and extending upwardly to define a circular opening smaller in diameter than the width of said bottom, means extending upwardly from the junction of said side walls and transition portion to form a support surface above said opening, legs attached to the corners of said bottom, and nesting shoulders shaped to mate with said legs attached to the four corners of said support surface.

11. A container having a substantially rectangular bottom and having side walls attached to said bottom, a funnel shaped transition portion attached to said side walls and extending upwardly to define a circular end smaller in diameter than the width of said bottom, a bead formed on said small circular end of said transition portion, a spout removably attached to said bead in gas tight relation, means extending upwardly from the junction of said walls and transition portion to form a support surface above said end, legs attached to the corners of said bottom, and nesting shoulders shaped to mate with said legs attached to the four corners of said support surface.

12. A container as set out in claim 10 wherein said means extending upwardly from said junction comprise integral extensions of said side wall, and a top joining the upper edges of said extensions and forming said support surface, said extensions and top enclosing said transition portion, said top having an opening concentric with said first mentioned opening.

13. A container as set out in claim 10 wherein said bottom and side walls form a rectangular body, and said means extending upwardly from said junction comprises parallel arms extending upwardly from the corners of said body, support members generally perpendicular to said arms connecting the upper ends of said arms and forming said support surface.

14. A container having a substantially rectangular bottom and having side walls attached to said bottom, a funnel shaped transition portion attached to said side walls and extending upwardly to define a circular end smaller in diameter than the width of said bottom, closable spout means attached to said small circular end of said transition portion in gas tight relation, means extending upwardly from the junction of said side walls and transition portion to form a support surface above said end, and legs attached to the corners of said bottom, the four corners of said support surface including nesting means shaped to mate with said legs.

15. A container as set forth in claim 14 in which each of said nesting means comprises a pair of vertically extending rigid barriers for preventing horizontal displacement of said legs, said barriers being parallel to the edges of said support surface and joined adjacent said corners thereof.

16. A container having a substantially rectangular bottom and having side walls attached to said bottom, a funnel shaped transition portion attached to said side walls and extending upwardly to define a circular end smaller in diameter than the width of said bottom, a bead formed on said small circular end of said transition portion, a spout attached to said bead in gas tight relation, said spout including movable means adjacent the end thereof remote from said bead for selectively closing said spout, means extending upwardly from the junction of said side walls and transition portion to form a support surface above said end, and legs attached to the corners of said bottom, the four corners of said support surface including nesting means shaped to mate with said legs.

References Cited in the file of this patent

UNITED STATES PATENTS

| | | |
|---|---|---|
| 708,942 | Torchiani | Sept. 9, 1902 |
| 1,496,507 | Wolfe et al. | June 3, 1924 |
| 1,607,774 | Morse | Nov. 23, 1926 |
| 1,849,950 | Murdock | Mar. 15, 1932 |
| 1,912,847 | Klepel | June 6, 1933 |
| 2,075,383 | Vaughn | Mar. 30, 1937 |
| 2,118,671 | Green | May 24, 1938 |
| 2,655,287 | Campbell | Oct. 13, 1953 |

UNITED STATES PATENT OFFICE
CERTIFICATE OF CORRECTION

Patent No. 2,862,645                      December 2, 1958

James H. Page et al.

It is hereby certified that error appears in the printed specification of the above numbered patent requiring correction and that the said Letters Patent should read as corrected below.

Column 3, line 66, for "aperture 25" read -- aperture 24 --;

column 7, line 53, for "said walls" read -- said side walls --.

Signed and sealed this 10th day of March 1959.

(SEAL)
Attest:

KARL H. AXLINE
Attesting Officer

ROBERT C. WATSON
Commissioner of Patents